331-98
CROSS REFERENCE SEARCH ROOM

Sept. 5, 1967 B. F. GREGORY 3,340,482
VARIABLE PARAMETER X-BAND OSCILLATOR
WITH TEMPERATURE COMPENSATION
Filed Dec. 18, 1963 4 Sheets-Sheet 1

INVENTOR
Benjamin F. Gregory
BY
Blair and Buckles
ATTORNEYS

Sept. 5, 1967 B. F. GREGORY 3,340,482

VARIABLE PARAMETER X-BAND OSCILLATOR
WITH TEMPERATURE COMPENSATION

Filed Dec. 18, 1963 4 Sheets-Sheet 2

INVENTOR
Benjamin F. Gregory
BY
Blair and Buckles
ATTORNEYS

INVENTOR
Benjamin F. Gregory
BY
Blair and Buckles
ATTORNEYS

INVENTOR.
Benjamin F. Gregory
BY
Blair, Buckles & Cesari
ATTORNEYS.

United States Patent Office 3,340,482 Patented Sept. 5, 1967

3,340,482

VARIABLE PARAMETER X-BAND OSCILLATOR WITH TEMPERATURE COMPENSATION

Benjamin F. Gregory, Tampa, Fla., assignor to Trak Microwave Corporation, Tampa, Fla.

Filed Dec. 18, 1963, Ser. No. 331,527
14 Claims. (Cl. 332—30)

The present invention relates to microwave devices having distributed parameter circuits. More particularly, it relates to a microwave source employing a vacuum tube triode as the active element and being capable of operating at X-band frequencies, e.g., at approximately 10,000 megacycles per second. Moreover, the present invention is directed to a temperature compensated vacuum tube triode oscillator whcih is tunable mechanically or electronically over a wide range of frequencies within the X-band frequency range.

Hitherto, such devices as magnetrons and klystrons were principally relied on as microwave sources capable of operating in the X-band frequency range. However, in certain applications, such as airborne communications systems, they offer distinct drawbacks. A principal disadvantage in their use in such applications is their relatively bulky size and heavy weight as compared to vacuum tube microwave oscillators.

In addition, both magnetrons and klystrons require high operating voltages and draw appreciable current as compared to vacuum tube microwave oscillators. For example, a klystron generally requires in excess of 500 volts to sustain an electron beam whereas, a vacuum tube oscillator may require only 150 volts. Thus, a significantly larger power supply is required which only aggravates the weight and space problems encountered in airborne system applications. A further advantage offered by vacuum tube oscillators is that they are typically more stable than klystrons in both the continuous wave and the pulsed operational modes.

In developing a vacuum tube oscillator for operation at X-band frequencies, the physical dimensions of the various parts become extremely critical since even a small dimensional variation constitutes a significant part of a wavelength of the energy being developed by the oscillator. Generally, these critical physical dimensions are empirically determined. Once in operation, however, temperature variation owing to the heat developed by the vacuum tube as well as adjacent equipment, cause dimensional changes in the various parts of the oscillator due to thermal expansion. This, in turn, causes changes in the distributed parameters of the resonant circuits of the oscillator and a corresponding change in the operating frequency. To overcome this, some means of temperature compensation is generally resorted to. This temperature compensation usually takes the form of bimetallic strips which deform in response to temperature variations and function to offset the circuit parameter changes occasioned by thermal expansion of the oscillator parts thus maintaining the operating frequency substantially constant.

It has been found that these temperature compensating strips, while functioning to maintain a constant operating frequency, have a prejudicial effect on the amplitude of the energy being fed back from the output circuit to the input circuit of the oscillator. As a result, the output power of the oscillator varies according to variations in temperature.

When concerned with operation at ultrahigh frequencies, designers of vacuum tube oscillators have generally resorted to a design which forces the oscillator to oscillate in a higher operational mode than the fundamental or quarter-wave mode. For a particular frequency, the resonant circuits of an oscillator operating in the fundamental mode are roughly one-third the physical size relative to an oscillator operating in the three-quarter wave mode, for example. For an appreciation of the physical sizes invloved at X-band frequencies, the wavelength is on the order of 1.25 inches in length. Therefore, due to design considerations, operation in a higher mode is resorted to at ultrahigh frequencies. Unfortunately, the fundamental or quarter-wave operational mode is inherently more stable and efficient than operation in higher ordered modes.

It is therefore an object of the present invention to provide a vacuum tube microwave oscillator capable of sustaining oscillations in the fundamental operational at mode X-band frequencies.

An additional object is to provide a microwave source which is fully compensated such that the operating frequency and the output power remain substantially constant with variations in temperature.

A further object is to provide an X-band oscillatory source of extreme small size, light weight and rugged construction.

An important object is to provide an X-band vacuum tube microwave source capable of being tuned over a wide range of frequencies. A related object is to provide a mechanically tunable X-band microwave source having an expanded frequency tuning range.

A still further object is to provide an electronically tunable X-band vacuum tube source capable of frequency modulated or FM operation.

A further object is to provide an X-band microwave source capable of achieving the aforementioned objects and yet is simplified in design and readily assembled.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

Figure 1:
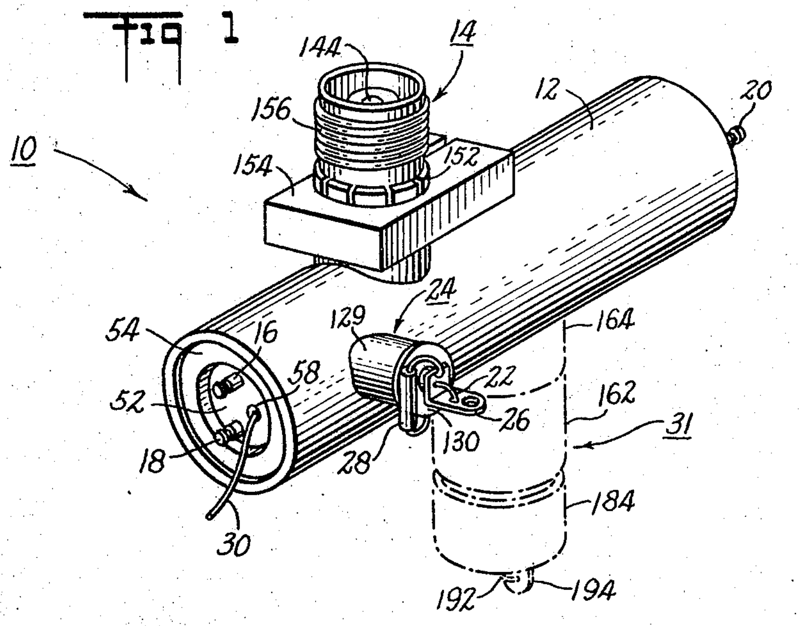
FIGURE 1 is a perspective view of a microwave source embodying my invention, with an optional FM portion shown in phantom.

In general and as seen in FIGURE 1, a source 10, capable of oscillatory operation at X-band frequencies, includes a cylindrical outer shell or housing 12 formed from electrically conductive material, preferably brass. A coaxial output connector, indicated generally at 14, communicates with the interior of the housing 12 to provide means for coupling electromagnetic energy developed by the source 10 to an output load, not shown. A pair of filament terminals 16 and 18 extending from one end of the housing 12 facilitates external circuit connection to a filament supply source, not shown, while a plate terminal 20 extending from the other end of the housing 12 provides for external circuit connection to a suitable B+ voltage source, not shown.

Figure 2:
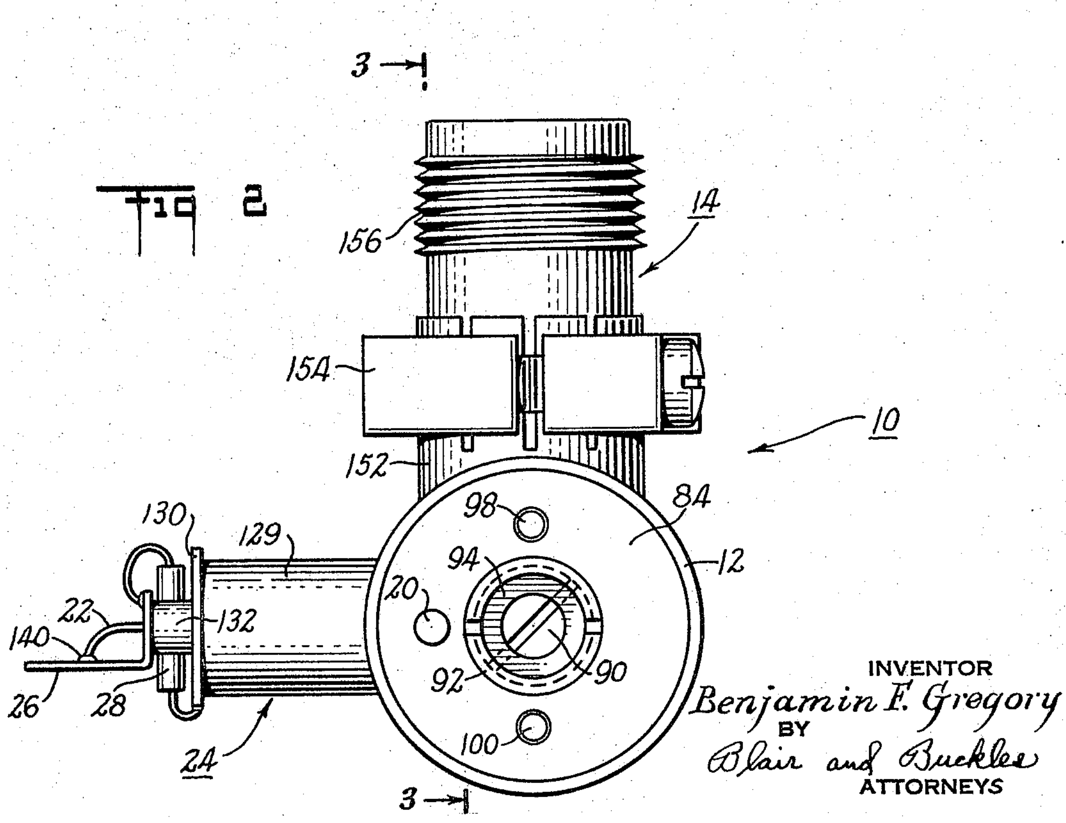
FIGURE 2 is an enlarged end elevation view of the microwave source of FIGURE 1.

Due to the small physical size of the source 10, where in one spcific physical embodiment the housing 12 measures ⅝ of an inch in diameter by 2 inches in length and weighs approximately 2 ounces, there is no available space within the housing 12 to accommodate a grid leak resistor. Moreover, normal installation of a grid leak resistor within the housing 12 would result in considerable attenuation of electromagnetic energy at X-band frequencies. Accordingly, and as also seen in FIGURE 2, a grid lead 22 is brought out from within the housing 12 through a quarterwave choke joint 24 for external circuit connection to a terminal member 26. The terminal 26 is, in turn, connected back to the housing 12, maintained at ground potential, through grid leak resistor 28. A cathode lead 30, electrically insulated from the housing 12, is brought out for external circuit connection to appropriately bias the source 10. According to a second embodiment of the invention, a varactor mounting, indicated generally at 31, is provided for frequency modulation of the source 10 as detailed in connection with FIGURE 7.

Figure 3:
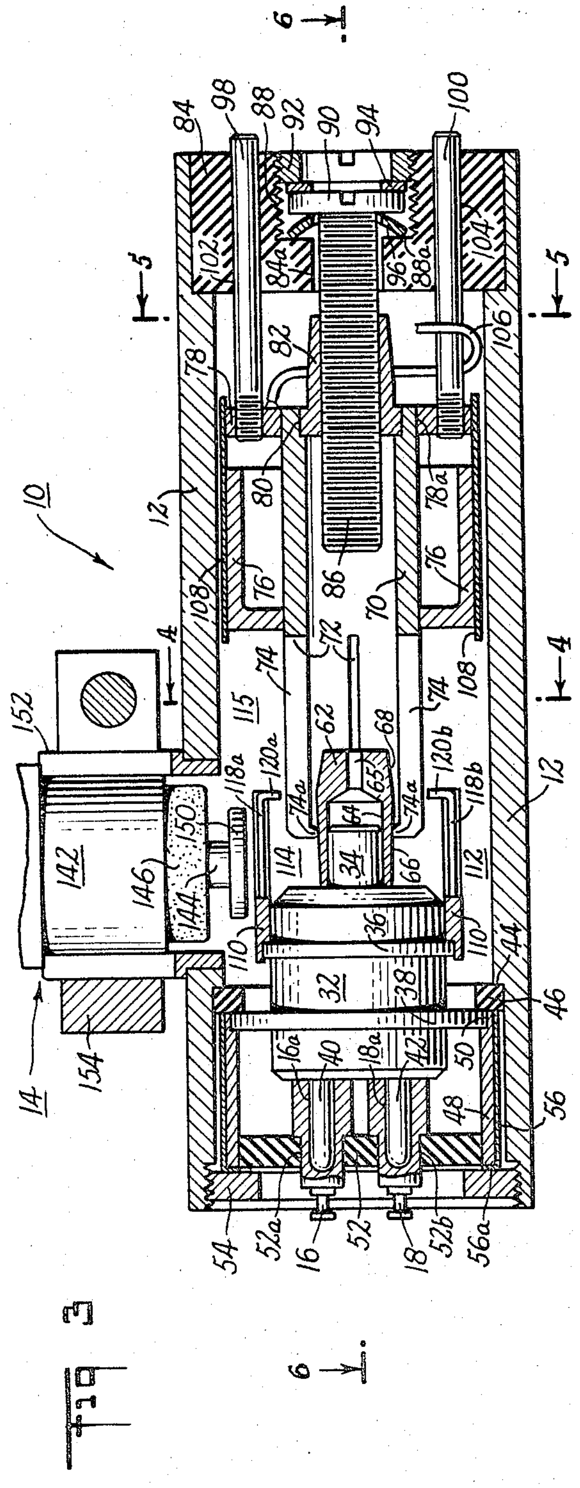
FIGURE 3 is a sectional side elevation view taken along line 3—3 of FIGURE 2.

As seen in FIGURE 3, a microwave triode 32, which may be a General Electric Y–1171 or its equivalent, is rigidly mounted concentrically within the housing 12. The triode 32 includes a plate pin 34, a grid ring 36, a cathode ring 38 and a pair of filament pins 40 and 42.

In order to rigidly mount the triode 32, an annular shoulder 44 is formed in the internal surface of the housing 12 at a point spaced from the lefthand end as seen in FIGURE 3. An annular spacer 46 of insulating material is seated against the shoulder 44. A cathode sleeve 48 of conductive material is provided with an internal annular recess 50 at one end for receipt of the cathode ring 38 of triode 32. The cathode sleeve 48 is affixed to the cathode ring 38 by any suitable means, such as solder. On insertion of the triode 32 into the open end of the housing 12, the cathode ring 38 along with the cathode sleeve 48 seat against the spacer 46.

A filament block 52, of suitable insulative material such as phenolic, is inserted in the open end of cathode sleeve 48 and serves to retain filament pins 40 and 42 in electrical contacting engagement with internal sockets **16*a* and 18*a* respectively, formed in filament terminals 16 and 18. The filament terminals 16 and 18 extend through spaced holes 52*a* and 52*b* in filament block 52 and are thus maintained electrically insulated from each other. A tube retaining nut 54, threaded into the end of housing 12, engages the cathode sleeve 48 and the filament block 52 to clamp the triode 32** in place.

In order to insulate the cathode sleeve 48 from the housing 12, the outer peripheral surface of the cathode sleeve 48 is covered with a layer 56 of insulative material such as terephthalate polyester, more commonly known as Mylar. The insulative layer 56 is continued over the end of the cathode sleeve 48 as indicated at **56*a* to insulate the cathode sleeve from the retaining nut 54**.

In the preferred manner of operation of the source 10, the cathode 38 of the triode 32 is floating, e.g., electrically insulated from the housing 12 at low frequencies or D.C., but grounded through the housing 12 at radio frequencies. As above described, the tube is rigidly mounted in the housing 12 and yet, is electrically insulated from the housing by the insulative spacer 46 and the insulative layer 56. However, due to the close spacing therebetween, the cathode sleeve 48 is capacitively coupled to the housing 12 at radio frequencies.

In addition, the cathode sleeve 48 is of appropriate physical length so as to function as a quarter-wave choke joint to effectively contain the electromagnetic energy developed within the housing 12. As more clearly seen in FIGURE 6, external connection to the cathode ring 38 of triode 32 is effected by the cathode lead 30 which extends through a hole 58 in the filament block 52 for electrical connection to the cathode sleeve 48 as indicated at 60.

Returning to FIGURE 3, a plate line member 62 is provided with an internal bore 64 for receipt of the plate pin 34 of triode 32. The plate line member 62 is affixed in electrical contacting engagement with the plate pin 34 by any convenient means such as solder admitted through the reduced diameter bore 65. The outer peripheral surface of the plate line member 62 is formed having a tapered surface portion 66 and a beveled surface portion 68.

A tubular sliding line member 70 is formed with four longitudinally extending slots 72 to define an equal number of integral resilient fingers 74 (seen also in FIGURE 4), making electrical contact with the plate line member 62. In particular, the free end of each resilient finger 74 is turned inwardly to form a contactor portion **74*a* mechanically biased into electrical contacting engagement with the plate line member 62 along its tapered surface portion 66. The beveled surface 68 of plate line member 62 serves to spread the resilient fingers 74 such that they will readily ride over the outer peripheral surface of the plate line member 62 to the tapered surface portion 66 during the initial assembly of the source 10**.

An annular tuning choke member 76 is affixed to the tubular sliding line member 70, such as by solder, at a point beyond the slots 72. The end of the sliding line member 70 remote from the integral fingers 74 is mounted in a central aperture **78*a* of a tuning drive plate 78. The tubular sliding line member 70, in turn, is relieved internally at 80 for rigidly mounting a tuning lock nut 82**.

An end plug 84, formed of insulative material, is received in the open end of the housing 12 and retained in place by any suitable means. A tuning screw 86 projects through a central aperture **84*a* in the end plug 84 and into threaded engagement with the tuning lock nut 82. The end plug 84 is counterbored at 88 to accommodate the head 90 of the tuning screw 86. An annular captive nut 92 in threaded engagement with the counterbore 88 in end plug 84 is advanced into engagement with a thrust washer 94 interposed between the head 90 of tuning screw 86 and the captive nut 92. A bowed washer 96 disposed between the head 90 of tuning screw 86 and the bottom surface 88*a* of counterbore 88 urges the tuning screw outwardly against the thrust washer 94** to remove any axial play in the tuning screw.

It will thus be seen that rotation of the tuning screw 86, being in threaded engagement with lock nut 82 but constrained from axial movement by the washers 94 and 96, will cause conjunctive axial movement of the sliding line member 70 and the tuning choke 76. Once the longitudinal position of these two members is determined, the captive nut 92 may be advanced inwardly thereby locking the tuning screw 86 against inadvertent rotational motion.

In order to coaxially align the tuning choke 76 and the sliding line 70 and also prevent rotational movement thereof, a pair of guide rods 98 and 100 are slidingly received in guide holes 102 and 104 formed in the end plug 84. The inner ends of guide rods 98 and 100 are threaded into the drive plate 78.

Figure 5:
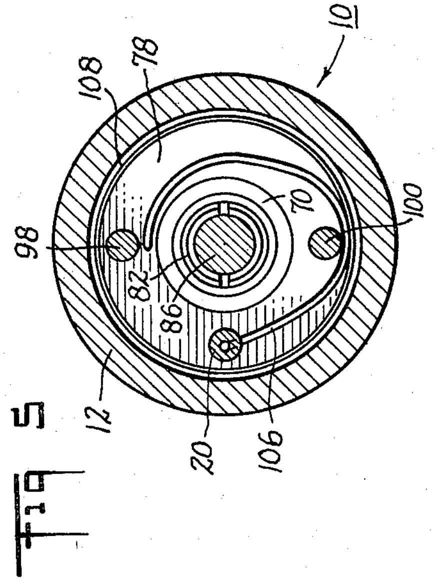
FIGURE 5 is a sectional end elevation view taken along line 5—5 of FIGURE 3.
Figures 6, 7, 8:
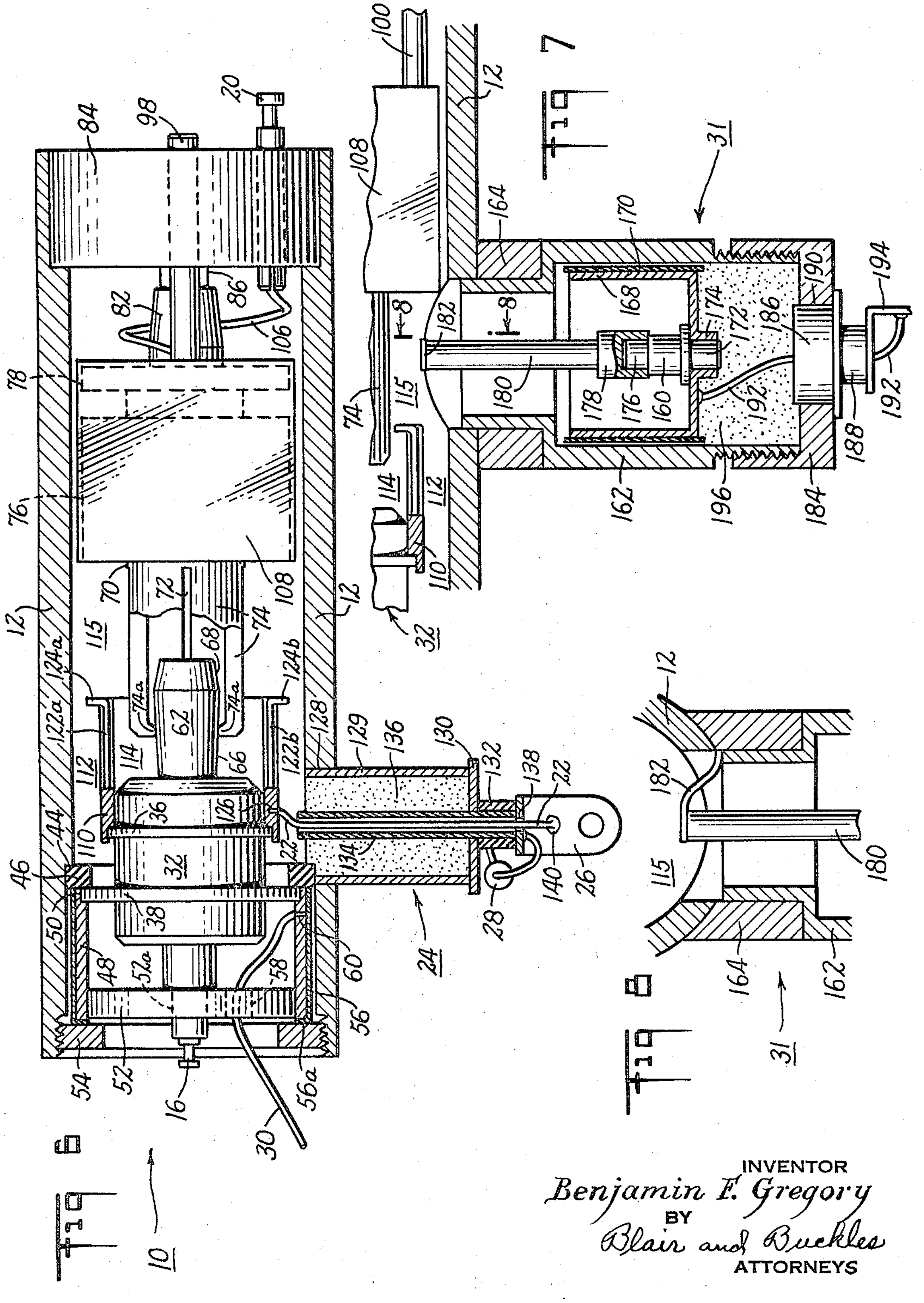
FIGURE 6 is a sectional top view taken along line 6—6 of FIGURE 3.
FIGURE 7 is a sectional side elevation view of a portion of the source of FIGURE 1 as adapted for FM operation in accordance with an additional embodiment of the invention.
FIGURE 8 is a sectional end elevation view taken along lines 8—8 of FIGURE 7.

With concurrent reference to FIGURES 3, 5 and 6, a plate lead conductor 106 provides circuit connection between the drive plate 78 and the plate external terminal 20, which projects through and is mounted in end plug 84. Thus, a D.C. circuit path for the energization of the plate of the triode 32 is effected from terminal 20 through conductor 106, drive plate 78, sliding line 70, resilient fingers 74, and the plate line member 62 to the plate pin 34. The plate lead conductor 106 is of sufficient length to accommodate relative displacement of the drive plate 78 from the plate terminal 20 without causing appreciable flexure of the conductor. The outer peripheral surface of the tuning choke 76 and the drive plate 78 is covered with a continuous Mylar tape layer 108 to prevent direct electrical contact between these elements and the housing 12. Inasmuch as the end plug 84 is formed of insulative material, the D.C. path for the B+ energization circuit is fully insulated from the housing 12.

Still referring to FIGURE 3, a tubular grid sleeve member 110 is concentrically mounted on triode 32 in electrical contacting engagement with the grid ring 36. The grid sleeve member 110 is inserted over the body of triode 32 and affixed to the grid ring 36 by any suitable means such as solder.

Figure 4:
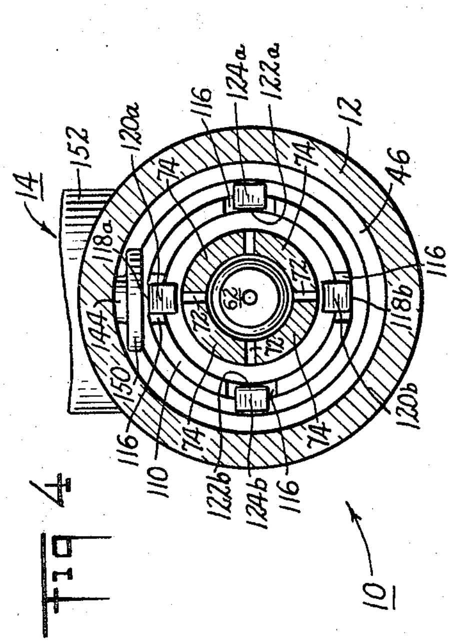
FIGURE 4 is a sectional end elevation view taken along line 4—4 of FIGURE 3.

The grid sleeve 110 defines, in combination with the housing 12, a distributed parameter circuit hereinafter referred to as the cathode coaxial line 112, and, in combination with the plate line member 62 and sliding line member 70, a second distributed parameter circuit hereinafter referred to as the plate coaxial line 114. Moreover, the unsupported end of the grid sleeve 110 and the tuning choke 76 define a cathode-plate coaxial line 115 bounded by the housing 12 and the sliding line 70. The grid sleeve member 110 is formed having a plurality of circumferentially spaced slots 116 which, in the present embodiment are four in number as seen in FIGURE 4. The slots 116 extend from the unsupported end of the grid sleeve 110 to a point adjacent the body of triode 32.

A first pair of temperature responsive bimetallic strips 118*a* and 118*b* are disposed in diametrically opposed slots 116 in grid sleeve member 110. These longitudinally extending bimetallic strips 118*a* and 118*b* are affixed at one end to the grid sleeve member 110 at the closed end of the slots 116. The free ends 120*a* and 120*b* of bimetallic strips 118*a* and 118*b*, respectively, are turned inwardly adjacent the unsupported end of grid sleeve 110 and extend to a point in close proximity to the resilient fingers 74 integrally formed with the sliding line member 70.

Turning to FIGURE 6, a second pair of temperature responsive bimetallic strips 122*a* and 122*b* are disposed in the remaining two diametrically opposed slots 116 in the grid sleeve member 110. The bimetallic strips 122*a* and 122*b* are affixed to the grid sleeve member 110 in the same manner as strips 118*a* and 118*b*. Their free ends 124*a* and 124*b* are outwardly turned at a point coinciding with the unsupported end of the grid sleeve member 110 and extend to a point adjacent the interior surface of housing 12.

Still in reference to FIGURE 6, the insulated grid lead conductor 22 is electrically connected to the grid sleeve member 110 at point 126 by any suitable means such as solder. The grid lead is brought out through an opening 128 in housing 12 via the quarter-wave choke joint 24 for electrical connection to the terminal member 26. The quarter-wave choke joint 24 includes a conductive tubular member 129 mounted in opening 128 by any suitable means such as dipped brazing. A conductive end plate 130 closes off the outer end of member 129. An insulated sleeve 132 serves to insulatively mount the terminal 26 to the end plate 130. A tube 134 of insulative material is coaxially mounted within cylinder 129 by a shock absorbing material 136 such as Styrofoam. The tube 134 extends through a central aperture in end plate 130 and the interior of sleeve 132 to terminal member 26. The grid lead 22 is thus threaded through the tube 134 and continues on through a hole 138 in terminal member 26 for electrical connection to the terminal member at point 140 by any suitable means such as solder. As previously described in connection with FIGURE 2, the terminal 26 is electrically connected to the end plate 130 and thus to housing 12 through grid leak resistor 28. The axial length of the tubular member 129 is such that it functions as a quarter-wave choke and thereby effectively prevents leakage of electromagnetic energy from the interior of the housing 12. The provision of the Styrofoam 136 serves to cushion the grid lead 22 from mechanical shocks, to which the source 10 may be subjected once in application.

Considering FIGURES 2 and 3, the coaxial output connector 14 includes a cylindrical outer conductor 142 and a coaxial inner conductor 144 spaced apart by a suitable dielectric medium 146. One end of inner conductor 144 projects through an aperture 148 into the interior of housing 12 and supports a disc 150 of electrically conductive material which serves to enhance the coupling of electromagnetic energy from the cathode coaxial line 112. The output connector 14 is inserted in a sleeve 152 received in aperture 148 and affixed to the housing 12 by any suitable means such as dip brazing. As seen in FIGURE 2, the upper end of sleeve 152 is slotted in order that the output connector 14 may be clamped in place by means of clamp 154. The upper end of output connector 14 is provided with external threads 156 to facilitate connection to addition coaxial line for coupling the source 10 to an output load.

In accordance with the well-known theory of operation of re-entrant oscillators the plate coaxial line 114, the cathode plate coaxial 115 and the cathode coaxial line 112 are effectively connected in series by the grid sleeve 110 which, in the present embodiment, operates in the fundamental or quarter-wave mode. Thus, with appropriate supply voltages applied to the filament terminals 16, 18 and the plate terminal 20, electromagnetic energy delivered to the plate coaxial line 114 by the electron beam in the triode 32 is fed back by way of coaxial lines 115 and 112 for application across the grid terminal 36 and cathode terminal 38 in proper phase and amplitude to sustain oscillatory operation of the triode. A portion of this electromagnetic energy is coupled to an output load by way of the output connector 14.

In order to tune the source 10 to a desired continuous wave operating frequency, the tuning screw 86 is rotated, resulting in conjunctive axial movement of the tuning choke 76 and the sliding line member 70. The axial position of the tuning choke 76 and the sliding line member 70 determine the physical dimensions of cathode-plate coaxial line 115 and the plate coaxial line 114 which, in turn, establish the operating frequency of the source 10. Movement of the choke 76 and sliding line member 70 to the left, as seen in FIGURE 3, reduces the dimensions of lines 115 and 114, thus increasing the operating frequency. On movement to the right, the converse situation obtains.

Figure 9:
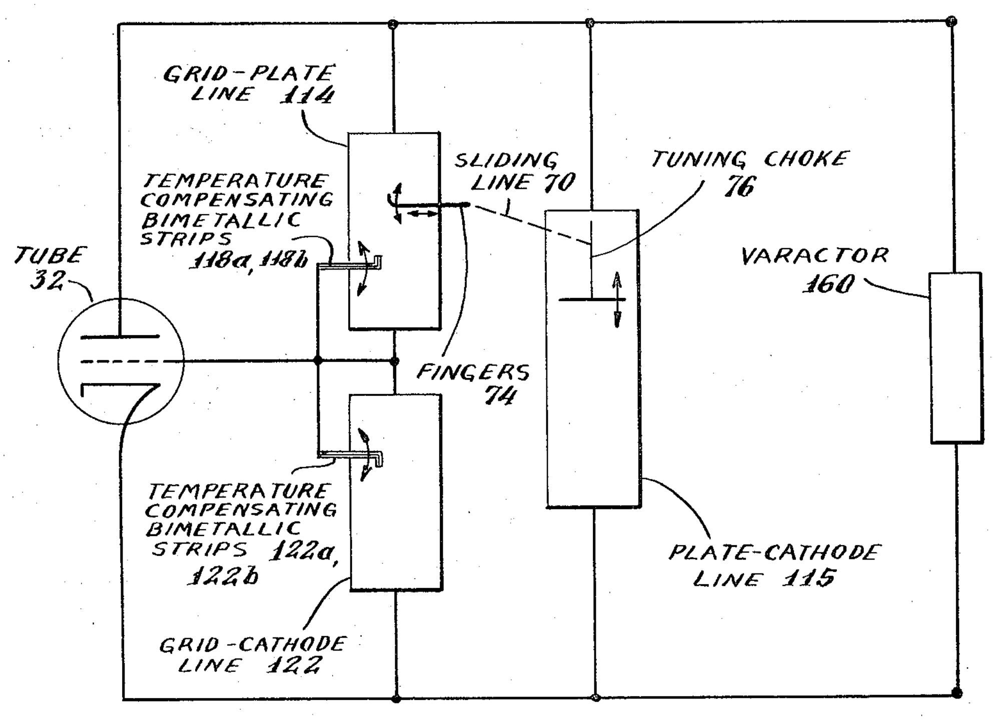
FIGURE 9 is a diagrammatic illustration of the invention to facilitate interpretation of the claims.

According to an important feature of my invention diagrammatically illustrated in FIG. 9, the plate line member 62 and sliding line member 70 coact to extend the frequency tuning range achieved by manipulation of the tuning screw 84. As the sliding line member 70 is axially moved to the left as seen in FIGURE 3, the resilient fingers 74, riding on the tapered surface 66 of plate line member 62, converge slightly causing a reduction in the characteristic impedance of the plate coaxial line 114 which includes the lumped capacity concentrated at the unsupported end of the grid sleeve 110. This reduction in characteristic impedance results in a further increase in the resonant frequency of the plate coaxial line 114 than is ordinarily achieved solely by axial movement of the sliding line member 70 to the left as seen in FIGURE 3.

On axial movement of the sliding line member 70 to the right, the ordinary decrease in operating frequency is augmented by the spreading of the resilient fingers 74 as they ride up the tapered surface 66 of the plate line member 62. The radial spacing between the resilient fingers 74 of the sliding line member 70 and the unsupported end of the grid sleeve member 110 is thus decreased resulting in an increase in the lumped capacity in the plate coaxial line 114 concentrated at that point. Since the resonant frequency of an electrical tank circuit is inversely proportional to its capacity, the resonant frequency of plate coaxial line 114 is reduced to a greater extent than is achieved solely through axial movement of the sliding line member 70 to the right as seen in FIGURE 3. I have found that a frequency tuning range on the order of 500 megacycles is achieved by forming the surface 66 of plate line member 62 with a taper of approximately 2°–3°.

Turning to the temperature compensating feature of my invention diagrammatically illustrated in FIG. 9, on increases in temperature the various parts of the source 10 expand resulting in a decrease in the operating frequency. To compensate for this decrease in operating frequency, the temperature responsive bimetallic strips **118*a* and 118*b*, as seen in FIGURES 3 and 4, deflect outwardly resulting in a decrease in the lumped capacity at the unsupported end of the grid sleeve 110 concentrated between the inwardly turned ends 120*a* and 120*b* and the resilient fingers 74 of sliding line 70. As previously noted in connection with the tuning of source 10, a decrease in capacity causes an increase in the resonant frequency of plate coaxial line 114**.

At the same time, the temperature responsive bimetallic strips **122*a* and 122*b*, as seen in FIGURES 4 and 6, deflect inwardly on increasing temperatures to cause a decrease in the lumped capacity in the cathode coaxial line 112 concentrated between the housing 12 and the outwardly turned ends 124*a* and 124*b* of strips 122*a* and 122*b*, respectively. Since the amplitude of feedback energy is largely determined by the ratio of the capacity in the cathode coaxial line 112 and the plate coaxial line 114, corresponding reductions in their respective capacities through operation of the bimetallic strips 118*a*, 118*b*, 122*a* and 122*b* on increasing temperatures serves to maintain this ratio substantially constant which, in turn, maintains the output power of source 10 substantially constant. In the event of decreasing temperatures, the operation is of course reversed and both the operating frequency and the output power of source 10** are again maintained substantially constant.

An additional important feature of my invention resides in the quarter-wave choke joint mounting of the triode 32 by which the cathode terminal 38 is insulated from the housing 12 for low frequencies or D.C. but is effectively coupled to the housing 12 through cathode sleeve 48 at radio frequencies. This permits the inclusion of a cathode biasing resistor (not shown) which in practice is connected at one end to the cathode lead 30 and the other end grounded to the housing 12. With this external circuit arrangement, the B+ supply voltage applied to terminal 20 may be increased while maintaining the plate current of triode 32 within tolerable limits. The increased B+ supply voltage yields higher operating frequencies for the triode 32 than was possible with a ground cathode arrangement. Ordinarily, the plate current can be limited by varying the size of the grid leak resistor 28, however at X-band, the triode 32 is operating so near Class A operation that very little grid current is drawn.

With the embodiment shown in FIGURES 7 and 8 to incorporate the varactor mounting 31 in source 10, a varactor 160 is electrically connected in parallel with the cathode-plate coaxial line 115 in order to effect frequency modulated or FM operation of the source 10. In this additional embodiment of the invention, all other parts of the source 10 are as previously described in connection with FIGURES 1–6. It should be appreciated however that since the source 10 is to be operated as an FM device the temperature compensating bimetallic strips 118, 122 may be eliminated. As seen in FIGURE 7, a tubular housing 162 is inserted through a collar 164 affixed to the housing 12 and into an aperture 166 formed in the housing for communication with the cathode-plate coaxial line 115. The housing 162 is maintained in place and electrically connected to the housing 12 by any suitable means such as set screws, not shown, advanced through the collar 164 into engagement with the housing 162. The varactor 160 is mounted concentrically within the housing 162 by a quarter-wave choke joint 168. The choke joint 168 is electrically insulated from the housing 162 for D.C. or other low frequencies by a wrapping 170 of insulating tape such as Mylar.

Terminal 172 of varactor 160 is mounted in electrically conductive engagement with a terminal socket 174 integrally formed with the choke joint 168. The other varactor terminal 176 is received in a terminal socket 178 formed in one end of a coaxial line member 180. The coaxial line member 180 extends partially into the cathode-plate coaxial line 115 of source 10 and is electrically returned to ground potential by an electrically conductive strap 182 as better seen in FIGURE 8. The strap 182 being attached to the inner end of the coaxial line member 180 and the inner end of the housing 162 also serves as a support for concentrically mounting the coaxial line member and the varactor 160 within the housing 162.

The outer end of the tubular housing 162 is closed off by an end cap 184. A pair of insulating plugs 186 and 188 mounted in a central aperture 190 in end cap 184 are provided with central apertures for admitting a bias lead 192 connected between the choke joint 168 and an external terminal 194. The space between the end cap and the choke joint 168 is packed with a shock absorbing material 196 such as Styrofoam to protect the delicate bias lead 192 as well as to cooperate with the resilent strap 182 to cushion the mounting of the varactor 160 against vibrational and inertial shocks.

The basic operation of the source 10 as a frequency modulated source is essentially identical to that previously described for the continuous wave source. The varactor 160, being electrically connected across the cathode-plate coaxial line 115 of the source 10, provides an additional frequency tuning function. The varactor 160, when appropriately back-biased with a biasing potential (not shown) connected to the external terminal 194 and thence to varactor terminal 172 via bias lead 192, functions as a nonlinear capacitor. Thus, by varying the biasing voltage, the capacitance presented by the varactor 160 is accordingly varied. This variable capacitance serves to vary the reactance of the cathode-plate coaxial line 115 causing a corresponding variation in the operating frequency of the source 12. Thus, with the biasing source serving as a frequency modulating source, the operating frequency of the source 10 is accordingly frequency modulated. The mechanically tuning function of the tuning choke 76 and the sliding line 70 (FIGURE 3) as distinguished from the electronic tuning function of the varactor 160 is advantageously used to establish the center operating frequency for FM operation of the source 10.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A microwave source comprising, in combination,

A. a first distributed parameter circuit,

B. a second distributed parameter circuit,

C. a vacuum tube triode coupled to said first and second distributed parameter circuits, D. means for coupling feedback energy from said first distributed parameter circuit to said second distributed parameter circuit and E. temperature compensating means physically located in said first and second distributed parameter circuits and operable in response to temperature variation to (1) vary an electrical parameter of said first distributed parameter circuit to maintain the resonant frequency thereof substantially constant with variations in temperature and to simultaneously (2) vary an electrical parameter of said second distributed parameter circuit so as to compensate for the electrical parameter variation in said first distributed parameter circuit thereby maintaining the character of the feedback energy substantially constant with variations in temperature.

2. The device claimed in claim 1 wherein said temperature compensating means includes (3) a first temperature responsive bimetallic element movable within said first distributed parameter circuit and (4) a second temperature responsive bimetallic element movable within said second distributed parameter circuit.

3. A microwave source comprising, in combination,

A. an electrically conductive housing,

B. a vacuum tube triode rigidly mounted within said housing and having plate, grid and cathode terminals, (1) said cathode terminal being electrically coupled to said housing, C. a conductive member electrically connected to said plate terminal, D. a grid sleeve electrically connected to said grid terminal, said sleeve (1) defining in combination with said conductive member a first distributive parameter circuit, (2) defining in combination with said housing a second distributed parameter circuit, (3) operating to couple feedback energy from said first to said second distributed parameter circuits, E. temperature compensating means mounted on said grid sleeve and operable in automatic response to temperature variation to (1) vary an electrical parameter of said first distributed circuit to maintain the resonant frequency thereof substantially constant with variations in temperature and to simultaneously (2) vary an electrical parameter of said second distributed circuit so as to compensate for the electrical parameter variation in said first distributed parameter circuit thereby maintaining the character of the feedback energy substantially constant with variations in temperature.

4. The device claimed in claim 3 wherein said temperature compensating means includes (3) a first temperature responsive bimetallic element operating in said first distributed parameter circuit and (4) a second temperature responsive bimetallic element operating in said second distributed parameter circuit.

5. In a microwave source having an electrically conductive housing, a vacuum tube triode rigidly mounted within said housing and having plate, grid and cathode terminals, said cathode terminal being electrically coupled to said housing, a conductive member electrically connected to said plate terminal, and a grid sleeve electrically connected to said grid terminal, said sleeve defining, in combination with said conductive member, a first distributed parameter circuit and, in combination with said housing, a second distributed parameter circuit, said sleeve operating to couple feedback energy from said first to said second distributed parameter circuit, the improvement of A. temperature compensating means operable in automatic response to temperature variation, said means including (1) a first bimetallic element mounted on said grid sleeve and deflecting with temperature variation to vary a first lumped reactive parameter in said first distributed parameter circuit thereby to maintain the resonant frequency thereof substantially constant, and (2) a second bimetallic element mounted on said grid sleeve and deflecting with temperature variation to vary a second lumped reactive parameter in said second parameter circuit thereby to compensate for the effect of the deflection of said bimetallic element on the amplitude of the feedback energy.

6. The improvement claimed in claim 5 wherein (3) said first and second bimetallic elements are disposed in spaced slots formed in said grid sleeve (a) said first bimetallic element having an inwardly extending end portion disposed adjacent said conductive member, (b) said first bimetallic element deflecting with increasing temperature to move said inwardly extending end portion away from said conductive member, and (c) said second bimetallic element having an outwardly extending end portion disposed adjacent said housing, (d) said second bimetallic element deflecting with increasing temperature to move said outwardly extending end portion away from said housing.

7. A microwave source including

A. a distributed parameter circuit;

B. a tuning plunger selectively movable in a longitudinal direction to vary the physical length of said circuit to thereby tune the operating frequency of the source over a range of frequencies; and C. means mechanically connected to said tuning plunger and movable in conjunction therewith in a substantially lateral direction to vary a lumped reactive parameter of said circuit such as to extend the frequency tuning range of the source.

8. The device claimed in claim 7 which further includes

D. a second distributed parameter serially coupled to said first distributed parameter and E. an electronically variable reactance element electrically coupled to said second distributed parameter circuit for frequency modulating said source.

9. A microwave source comprising, in combination,

A. a conductive housing,

B. a vacuum tube triode disposed within said housing and having cathode, grid and plate terminals, (1) said cathode terminal being electrically coupled to said housing, C. a grid sleeve electrically connected to said grid terminal, D. means electrically connected to said plate terminal, said means (1) defining in combination with said grid sleeve and said housing a distributed parameter circuit, (2) adapted for movement in a first direction so as to vary the physical length of said distributed parameter circuit, and (3) adapted for movement in a second direction, concurrent with movement in said first direction, to simultaneously vary the spacing between said grid sleeve and said means.

10. The device claimed in claim 9 wherein said means include (4) a plate line member electrically connected to said plate terminal, (a) said plate line member having a tapered outer surface portion, (5) a tubular sliding line member arranged concentrically with said grid sleeve, said sliding line member being formed having a plurality of resilient fingers urged into engagement with said tapered surface portion (b) whereby movement of said sliding line member with respect to said plate line member causes variations in the spacing between said resilient fingers and said grid sleeve, and (6) a tuning plunger movable with said sliding line to vary the physical length of said circuit.

11. The device claimed in claim 10 wherein said tapered outer surface portion of said plate line member has a taper of approximately 2–3 degrees.

12. The device claimed in claim 10 which further includes

E. an electronically variable capacity disposed adjacent said grid sleeve for frequency modulating said source.

13. The device claimed in claim 12 wherein said electronically variable capacity comprises a varactor, said varactor (1) being mounted externally of said housing on a quarter-wave choke joint and (2) communicating with the interior of said source through an aperture in said housing.

14. The device claimed in claim 9 which further includes

E. temperature responsive means supported by said grid sleeve, said temperature responsive means including (1) a first bimetallic element movable toward and away from said means connected to said plate terminal, and (2) a second bimetallic element movable toward and away from said housing, (3) whereby to maintain the operating frequency and the output power of the source substantially constant with variations in temperature.

References Cited

UNITED STATES PATENTS

| | | | |
|---|---|---|---|
| 2,490,968 | 12/1949 | Keizer et al. | 331—98 X |
| 2,994,042 | 7/1961 | Power et al. | 331—98 |
| 3,173,106 | 3/1965 | McCulloch | 331—98 |
| 3,193,779 | 7/1965 | Beaty | 332—30 X |
| 3,209,287 | 9/1965 | Oxner et al. | 333—34 |
| 3,249,890 | 5/1966 | Beaty | 331—98 |

ROY LAKE, *Primary Examiner.*

ALFRED L. BRODY, *Examiner.*